July 15, 1958 W. F. CARR 2,843,237
BALL TYPE DISCONNECT
Filed Aug. 16, 1952 2 Sheets-Sheet 1

INVENTOR.
William F. Carr
BY
Leonard S. Chenfeld
Attorney

July 15, 1958 W. F. CARR 2,843,237
BALL TYPE DISCONNECT
Filed Aug. 16, 1952 2 Sheets-Sheet 2

INVENTOR.
William F. Carr
BY
Leonard S. Chinfield
Attorney

United States Patent Office 2,843,237
Patented July 15, 1958

2,843,237
BALL TYPE DISCONNECT

William F. Carr, Grand Rapids, Mich., assignor to Lear, Incorporated, Grand Rapids, Mich., a corporation of Illinois Application August 16, 1952, Serial No. 304,678

1 Claim. (Cl. 192—40)

This invention relates to mechanism for automatically connecting or disconnecting an electric-power driven element from a driven element upon interruption in electric current or for effecting such connection or disconnection upon application of an electric current, and is of the type which will subsequently allow manual driving of the driven element without reversely driving the electric power means.

One important application of the invention is in connection with an electric-motor driven servo-mechanism for operating control surfaces of an airplane, for example, a servo-mechanism receiving the output of an automatic pilot system of the electronic type.

In one such system the output signal of the amplifier, e. g. the turn control amplifier, is effective, depending upon the phase or polarity of the signal, to energize one or another of a pair of electromagnetic clutches to cause motion of the rudder in the desired direction. Through suitable gearing the output of the clutches is connected to a capstan upon which is wound the cable which moves the rudder. This same cable is connected to the pilot's "stick" or other manual control. In the event of jamming of the drive mechanism, e. g. seizing of the clutch, the motor fuse is likely to be blown due to this excessive load, and current failure results. In the absence of the invention improvement the jamming of the clutch is effective throughout the driven portion of the system to render manual overriding of the capstan very difficult. Consequently in the event of seizure of the driving portion of the mechanism, and the concomitant inability of the pilot to overcome the jamming torque, a serious hazard is presented.

My invention has for its principal object the provision of a device between the capstan and another member of the driven portion of the mechanism which will automatically engage the capstan and this member as long as current flow is uninterrupted, but will effect automatic disengagement upon current failure.

Another object is to provide means for effecting the engagement as aforesaid which is spring-biased to disengaged position, and wherein the force of the spring is supplemented to some degree by an inherent tendency of the engaging means to disengage, whereby the device is proof against accidental lock-up due to jamming or overload, of a degree which the bias means alone is unable to overcome.

Still another object is to provide engaging means in which the shock of engagement is reduced to a practical and acceptable minimum.

Other objects will become apparent from the following description which, taken together with the accompanying drawings, disclose a preferred mode of carrying the invention into practice.

Figure 1:
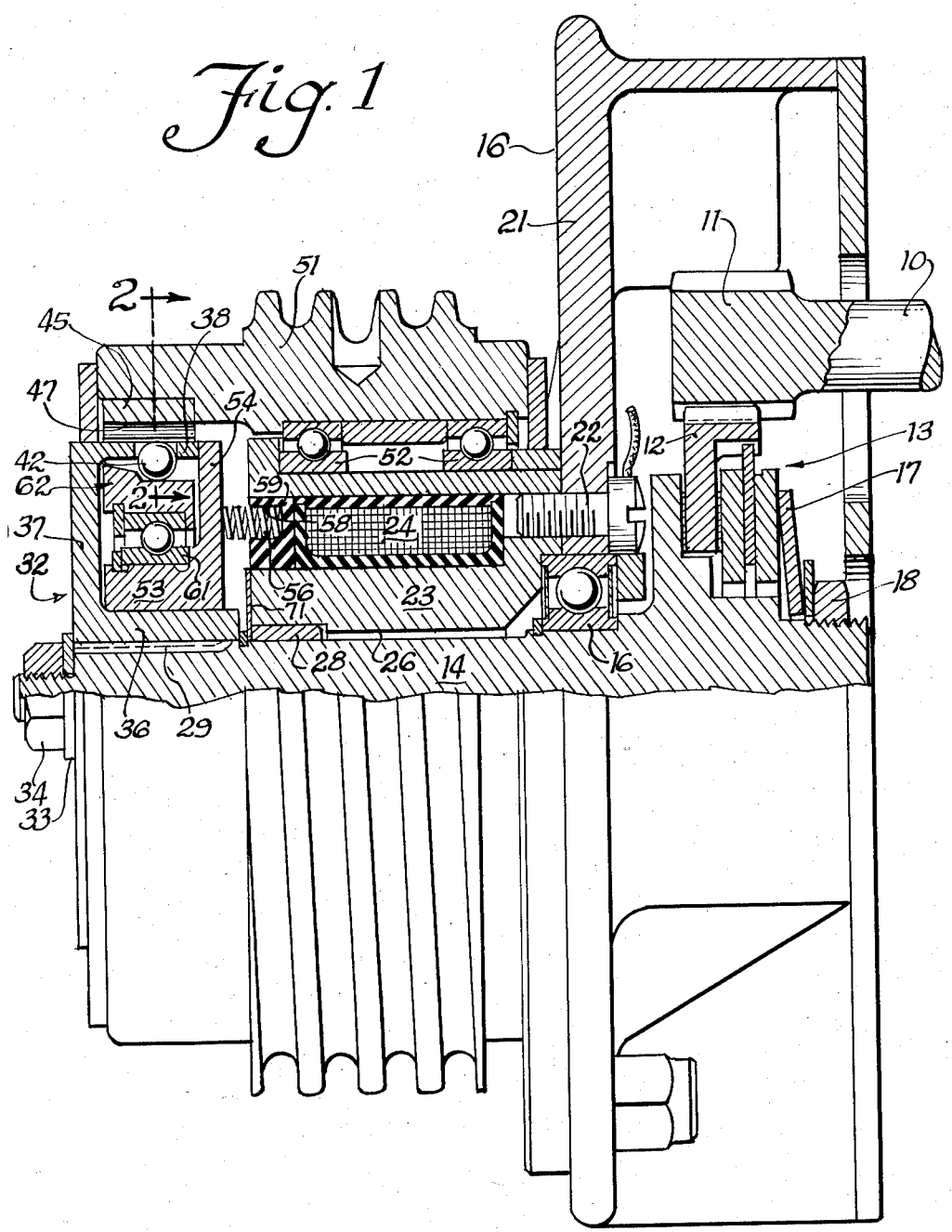
Fig. 1 shows a combined elevational and cross-sectional view of a device incorporating the invention disconnect mechanism.

Regarded in its broad aspects the invention contemplates the provision, between a source of power and a member to be driven thereby of a connecting and disconnecting mechanism which is caused to engage upon closure of an electrical circuit and will disengage automatically upon opening of said circuit. Moreover the mechanism is so arranged that upon automatic disconnection, the driven member may be actuated manually or by other power means without the necessity of back-driving the driving means. Consequently, in the event the driving means is subjected to substantial friction, as for example, jamming, no unusual force will be presented to manual override of the driven member. Thus I provide a plurality of balls or equivalent elements having a rolling surface individually retained in a circular cage, and free for radial movement about what may be termed the principal axis of rotation of the mechanism. A solenoid is mounted adjacent the cage for operation of a camming member which in turn will actuate the rollable elements. The camming member is itself ferro-magnetic, or is provided with a ferro-magnetic armature whereby, upon energization of the solenoid, the camming member is operated axially in one sense. Springs are provided to bias normally the camming member in the opposite sense. Preferably the current to the power source, e. g. an electric motor, is also fed simultaneously to the solenoid so that rotation of the motor is coincident with pulling-in of the armature, viz. the camming member, and vice versa. The member intended to be driven, e. g. a capstan of an aircraft control surface rigging, is provided with an annular part having a plurality of recesses for engagement by the rollable elements upon radial outward movement thereof by the camming member, and whereby the driving and driven portions of the mechanism are united for joint rotation. In order to translate the axial movement of the camming member into radial movement of the rollable elements, the camming member is of annular form and is provided on its exterior with a pair of frusto-conical cam surfaces. The surfaces are designed to actuate the rollable elements in two stages. One surface has a relatively shallow apical angle in order that, upon pulling in of the armature, the rollable elements may be thrust toward and partially into their respective recesses, while the other cam surface has a comparatively sharp apical angle for finally seating the rollable elements firmly in their recesses, and to retain them therein under the urging of the solenoid. However, selection of the sharp apical angle must take into consideration that a practically zero angle may jam the camming member against release under a reasonable force, while an angle which is too large may require too large a solenoid to oppose the axially-directed reaction of the elements which tends to cause unlocking.

As heretofore noted the invention disconnect will be described as embodied in a capstan arrangement for actuating a control surface of an aircraft, although capable of general application. Thus, in Fig. 1, there is shown a power source, e. g. a shaft 10 driven by an electric motor, either directly or through a suitable clutch, and which shaft is integrated with a pinion 11 in mesh with a gear 12. This gear drives, through a friction clutch 13, a shaft 14 journalled in part in a suitable bearing 15 in the housing 16.

Although the torque-limiting clutch 13 forms no part of the invention per se it is pointed out that the same is of a well-known type wherein the driving member, i. e. the gear 12, imparts rotation to the driven member, i. e. the shaft 14, through friction discs to which force is applied by means of a resilient washer 17 and nut 18. Accordingly, in the event of momentary jamming or overload not requiring disconnection of the invention mechanism the gear may turn relatively to the shaft 14, and the destructive force of overload thereby relieved. Such jamming or overload may or may not be frequent, whereupon the clutch 13 will slip and the circuit breaker or fuse protecting the motor may remain intact, whereas sustained overload will be effective to open the breaker or to blow the fuse.

Affixed to a wall 21 of the housing 16, as by screws 22, is the ferromagnetic core 23 for a solenoid winding 24, the core being annular in form and including a bore 26 through which the shaft 14 extends. A bushing 28 carried in the bore 26 serves as additional support for the shaft 14. Winding 24 is in circuit with the electric motor (not shown) and is adapted to receive current for energization thereof coincidentally with current flow to the electric motor (not shown) for driving the shaft 10. Accordingly interruption of current to the motor will cause deenergization of the solenoid.

Arranged to be rotated by the shaft 14, and therefore splined thereto, as at 29, is the annular cage member or ball retainer 32. Axial retention thereof is provided by a washer 33 and nut 34.

Figure 2:
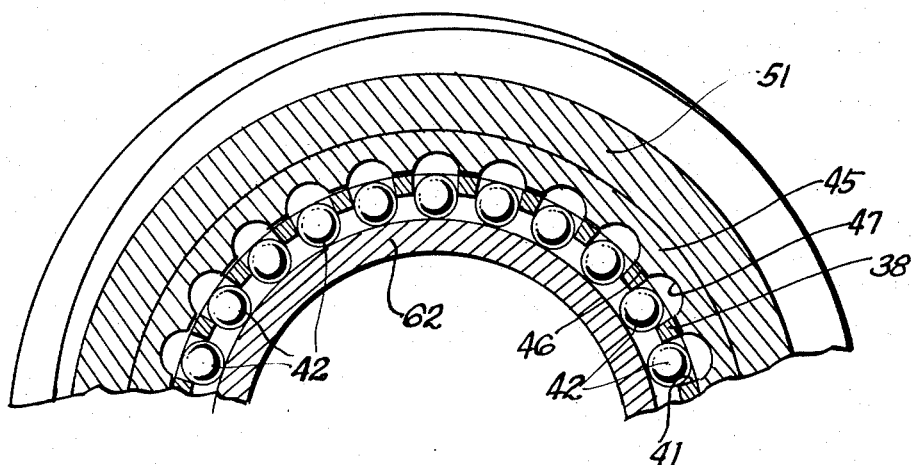
Fig. 2 is a partial cross section taken on the line 2—2 of Fig. 1.

The cage member 32 comprises a hub 36, a web 37 and a perforate flange 38. This latter extends axially, as shown, and has a plurality of equally spaced apertures 41 (Fig. 2) in each of which is rotatably received a rollable element, e. g. a ball 42. Alternatively the elements 42 may be cylindrical, barrel-shaped or other, the desideratum being that they shall have at least one axis of rotation parallel with the axis of shaft 14. In the present instance the apertures 41 are obviously preferably circular in outline and, for other forms of elements, will preferably be rectangular.

Positioned concentrically with the cage member 32 is the ring 45 which includes a surface 46 confronting the flange 38 and a plurality of indentations or recesses 47, one individual to each element 42, and adapted to be engaged thereby upon actuation by the solenoid in a manner to be described. Preferably, and as shown in Fig. 1, the recesses 47 are semi-cylindrical in order that any axial misalignment between the parts will not prohibit entry of the balls 42 into their respective recesses. Furthermore, it will be noted from Fig. 2 that the number of balls used for a given circumference is desirably a maximum when considered with the mechanical strength required for the sub-divisions defining the plurality of apertures in the cage. From Fig. 2 it will be observed that the circular pitch of the balls 42 may be made less than twice the diameter of a ball. It is also important that the lands intermediate the recesses 47 not be reduced too far as thereby regions of relatively small radii will be presented between the adjacent recesses and more rapid wear could occur. However, in any case, and having in mind the foregoing considerations, chatterless operation can be achieved only by utilizing as many balls as the foregoing mechanical considerations will allow.

Ring 45 is rigidly incorporated with the ultimately driven member, in this case the capstan 51 about which the operating cable for the ailerons, rudder or other control surface of the aircraft is wound. The capstan is supported for rotation with respect to the core 23 by means of ball bearings 52—52.

Arranged for axial sliding movement upon the hub 36 is the cam ring support 53 which includes a flange 54 against which a plurality of spaced-apart biasing elements, e. g. compression springs 56 may exert a force. The other ends of the several springs are received in bores 58 in the plastic ring 59 which acts in part to retain the winding 24.

In turn rotatably carried on the cam ring support by means of a ball bearing 61 is the cam ring 62 upon which the balls 42 rest. If desired the cam ring 62 may be non-rotatable, although for optimum performance it is preferred that the same be permitted to rotate.

Figure 3:
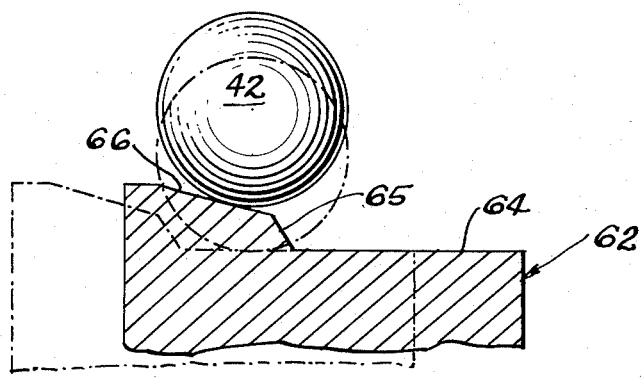
Fig. 3 shows a somewhat enlarged detail of the camming member and one of the locking balls.
Figure 4:
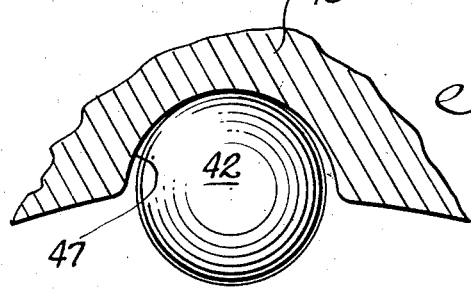
Fig. 4 is a somewhat enlarged detail to show the relationship between one of the balls and its seat.

Cam ring 62 (Fig. 3) is provided with three active surfaces: an axially directed or cylindrical surface 64 whereupon the balls may idle in the disengaged condition of the invention; a frusto-conical surface 65, which may be described as the surface of frustum of a cone having a comparatively large apical angle, in this case 110°; and a frustro-conical surface 66, which may be described as the surface of the frustum of a cone having a comparatively small, or sharp, apical angle, in this case 30°.

The apical angles just given are intended as exemplificative and comparative only. The gist or governing prinicple for selection of the angle for the surface 65 lies in the provision of an angle which will, upon energization of the solenoid thrust the balls rapidly outwardly and with the least shock and friction. It will be comprehended that too steep an angle will provide too much axial resistance, whereas too shallow an angle will result in a delayed action. While 90° might seem an ideal compromise it has been found in practice that the apical angle may be as steep as 110° without producing deleterious effects.

The selection of the angle for the surface 66 is likewise governed by several considerations. The most important of these is to provide a slope which tends to cam the ring 62 from under the balls 42 by virtue of the reaction of the driven member, e. g. the capstan, in order that deenergization of the solenoid and the releasing action of the springs 56 is facilitated and aided. However the slope of the surface 66 may not be too steep with respect to horizontal, for otherwise the solenoid must be unnecessarily massive in order to overcome the reverse camming component exerted by the balls. Of even greater importance is the avoidance of too shallow an angle, for then the cam ring tends to be wedged into active position by the radial component of the force exerted by the balls, and the springs 56 must then be stronger and the pull of the solenoid to overcome them increased accordingly.

Turning again to Fig. 1 the cam operating member 53 is made of ferromagnetic material or at least is provided with a part of such material so disposed that the flux created by the solenoid 24 may attract the member 53 and the associated cam ring 62 to the right. It will be understood that the ball bearing 61 is of a type which facilitates joint movement of the two parts 53 and 62. Upon such movement of the cam ring 62 the balls 42 (Figs. 2 and 3) are actuated radially outwardly by reason of the two surfaces 65 and 66, the full outward position of a typical ball being shown in full lines in Fig. 3, and the inactive position being shown in phantom. Accordingly upon such radial movement of the balls each will become lodged into a recess 47 to couple the ring 45 for rotation with the cage 32 and its associated shaft 14 for driving of the capstan 51. As mentioned hereinbefore the slope of the surface 66 is so selected that the holding current for the solenoid 24 is a minimum taking into account the force of the springs 56 and the uncoupling tendency of the recesses 47 reacting against the balls 42.

Upon deenergization of the solenoid 24 the force of the springs 56 combined with the axial component of thrust of the balls 42 against the cam surfaces 66 and 65 will return the cam ring 62 and cam operating member 53 to the left, or idle, position as seen in Fig. 1, and the capstan will then be free for rotation through its cable or otherwise.

To minimize the holding effect of residual flux, a shim 71 of non-magnetic material is interposed between the left-hand face of the core 23 and the flange 54 of the member 53.

In order to assist in disengagement of the balls 42 from the ring 45 it is preferred that the radius of the recesses 47 be slightly greater than the radius of the balls. In the example the radius of the ball is 0.078", and of the recess 0.081". Furthermore it has been found desirable to round off the corners of the semi-cylindrical recesses 47, say to a radius of 0.020" in the instant case. By reason of the foregoing expedients engagement of the balls is effected with minimum shock, wear of the parts is minimized, and disengagement accelerated. In respect of the foregoing it will be understood that, at the moment of engagement, either or both of the members 51 and 32 may be rotating, and in the same or opposite directions.

The invention mechanism is capable of use with its principal axis horizontally disposed without any possibility of informal engagement by reason of the lowermost balls dropping into the lowermost recesses. Should this occur, and in general must be anticipated, the relative rotation of the parts would simply cause the recesses to cam the balls thereoutof, and no undesirable engagement occurs. Although the subject invention is intended primarily for low-speed applications wherein the effect of centrifugal force on the balls is of low order, no real problem need be expected even at moderately high speeds since the recesses will still tend to cam the balls thereoutof if the load is of a magnitude such that the radial component of disengaging force exceeds the centrifugal force.

Another important characteristic of the invention disconnect is absence of blacklash. Moreover the axial component of force exerted through the balls increases with the load, and therefore, by virtue of the inclined surface 66 the assistance afforded by this component in disengaging the drive increases with increasing load.

Where herein I have described the invention mechanism as engaged during application of current to the solenoid it will be understood that the same may be easily modified by interchanging the function of the springs 56 and the solenoid 24. If this is done then the engaged relation of the mechanism will correspond to the force of the springs, and the disengaged relation will correspond to energization of the solenoid.

While I have shown a particular embodiment of my invention, it will be understood, of course, that I do not wish to be limited thereto, since many modifications may be made, and I therefore contemplate by the appended claim to cover any such modifications as fall within the true spirit and scope of my invention.

Having thus described my invention, what I claim and desire to secure by Letters Patent is:

Mechanism for connecting and disconnecting a rotatable driving member to and from a rotatable driven member comprising a shaft to which the driving member is coupled, a cage member secured to said shaft for rotation therewith and including a hub and an annular part having a plurality of circumferentially spaced apertures therethrough, an annular cam member including a hub supported on said first hub for axial sliding movement with respect thereto, said cam member also having a pair of merged frusto-conical actuating surfaces, a plurality of spheres retained individually in said apertures for rotation about the axis of said shaft and arranged to be actuated as a group radially outwardly by said cam member upon axial sliding movement thereof in one sense, and an annular driven member positioned concentrically with respect to said elements and having a like plurality of semi-cylindrical recesses for individual engagement by said spheres upon radially outward movement thereof, said cam member having a ferromagnetic part, and a solenoid for actuation of said part to move said cam member axially upon energization of said solenoid, one of said actuating surfaces having a slope which is relatively steeply inclined with respect to the axis of the shaft and the other of said surfaces having a slope which is of relatively shallow inclination with respect to said axis, said steep surface being effective to cam said elements substantially completely into said recesses and said shallow surface being effective to cam said elements to the floor of said recesses and to maintain the same in that position, and bias means for cooperating in reverse movement of said camming member upon deenergization of said solenoid, the reaction of said elements due to the load being also effective against said cam surfaces to provide reverse movement of the camming member.

References Cited in the file of this patent
UNITED STATES PATENTS

| | | |
|---|---|---|
| 817,309 | Flynt | Apr. 10, 1906 |
| 1,635,144 | Stevens | July 5, 1927 |
| 1,703,502 | Spase | Feb. 26, 1929 |
| 2,366,739 | McCoy | Jan. 9, 1945 |
| 2,377,575 | Ringer | June 5, 1945 |
| 2,474,789 | Perhacs | June 28, 1949 |
| 2,548,269 | Ochtman | Apr. 10, 1951 |
| 2,621,494 | Cross | Dec. 16, 1952 |

FOREIGN PATENTS

| | | |
|---|---|---|
| 627,008 | Great Britain | July 26, 1949 |